US006993425B2

(12) United States Patent
Tange et al.

(10) Patent No.: US 6,993,425 B2
(45) Date of Patent: Jan. 31, 2006

(54) AUTOMOTIVE LANE DEVIATION AVOIDANCE SYSTEM

(75) Inventors: Satoshi Tange, Kanagawa (JP); Genpei Naito, Yokohama (JP); Shinji Matsumoto, Kanagawa (JP); Hiroyuki Yoshizawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 111 days.

(21) Appl. No.: 10/375,475

(22) Filed: Feb. 28, 2003

(65) Prior Publication Data

US 2003/0195667 A1 Oct. 16, 2003

(30) Foreign Application Priority Data

Apr. 11, 2002 (JP) ............................. 2002-109067

(51) Int. Cl.
*G01S 13/00* (2006.01)
*G08G 1/16* (2006.01)

(52) U.S. Cl. ........................... 701/96; 701/70; 340/435
(58) Field of Classification Search .................. 701/96, 701/70, 72, 75, 301, 302; 303/139, 140; 340/435, 436, 903
See application file for complete search history.

(56) References Cited

U.S. PATENT DOCUMENTS 4,735,114 A * 4/1988 Satoh et al. ................. 477/43

| | | | |
|---|---|---|---|
| 5,076,385 A * | 12/1991 | Terazawa et al. ........... 180/197 |
| 5,265,945 A | 11/1993 | Yamashita et al. | |
| 6,066,070 A * | 5/2000 | Ito et al. ......................... 477/43 |
| 6,282,478 B1 * | 8/2001 | Akita ........................... 701/70 |
| 6,411,901 B1 * | 6/2002 | Hiwatashi et al. .......... 701/301 |
| 6,442,469 B1 * | 8/2002 | Matsuno ....................... 701/70 |
| 6,482,122 B2 * | 11/2002 | Ochiai et al. .................. 477/42 |

FOREIGN PATENT DOCUMENTS

| JP | 5-221303 A | 8/1993 |
|---|---|---|
| JP | 11-34829 A | 2/1999 |
| JP | 2000-33860 A | 2/2000 |
| JP | 2000-168395 A | 6/2000 |
| JP | 2001-223227 A | 8/2001 |
| JP | 2001-225709 A | 8/2001 |
| JP | 2001-310719 A | 11/2001 |
| JP | 2002-46640 A | 2/2002 |

* cited by examiner

*Primary Examiner*—Thomas G. Black
*Assistant Examiner*—Dalena Tran
(74) *Attorney, Agent, or Firm*—Foley & Lardner LLP

(57) ABSTRACT

A lane deviation avoidance system for an adaptive cruise control system equipped vehicle includes an electronic control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane. The control unit puts a priority on the lane deviation avoidance control by limiting a driving force acting on the host vehicle, when there is the possibility of the host vehicle's lane deviation from the driving lane.

15 Claims, 4 Drawing Sheets

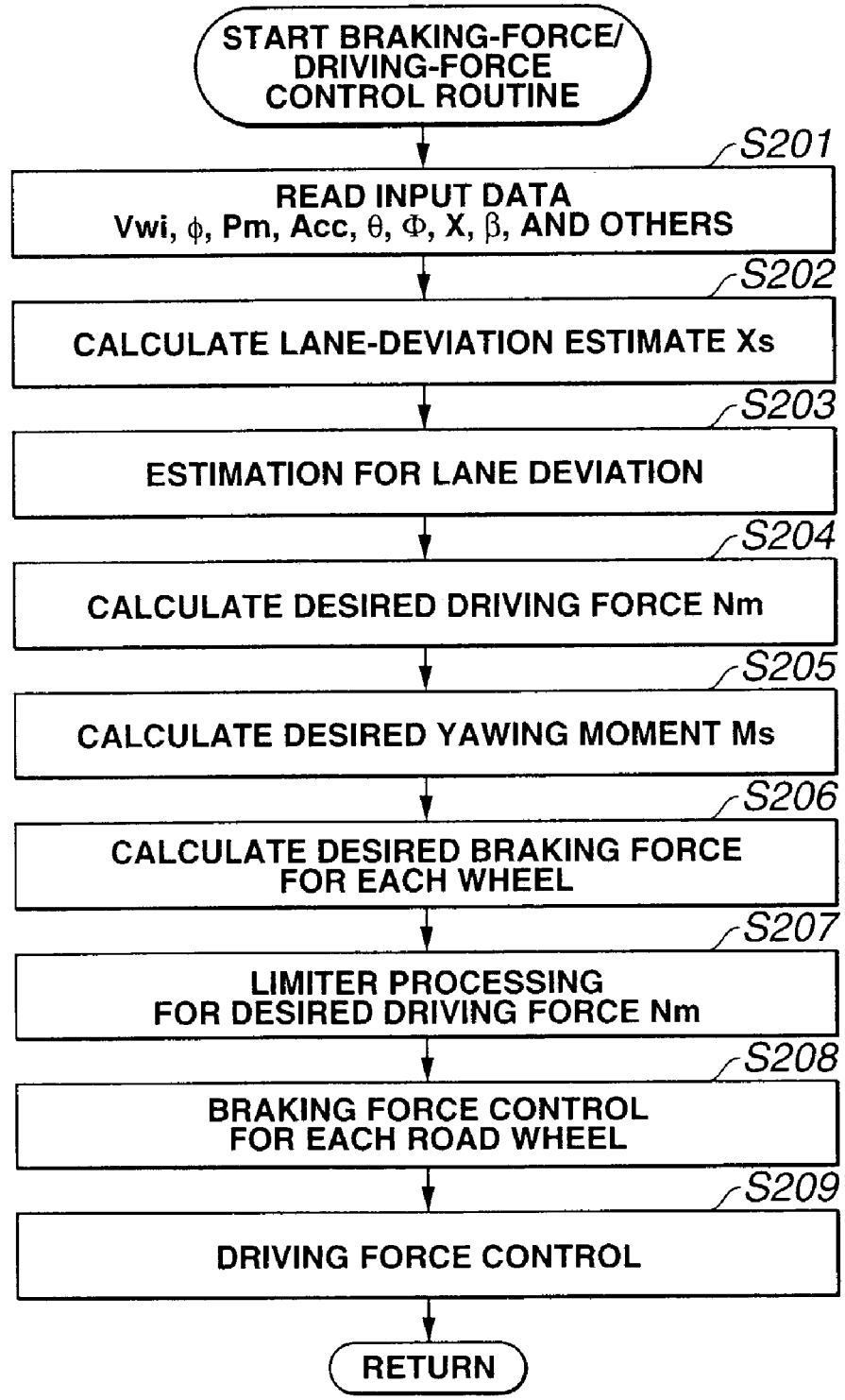

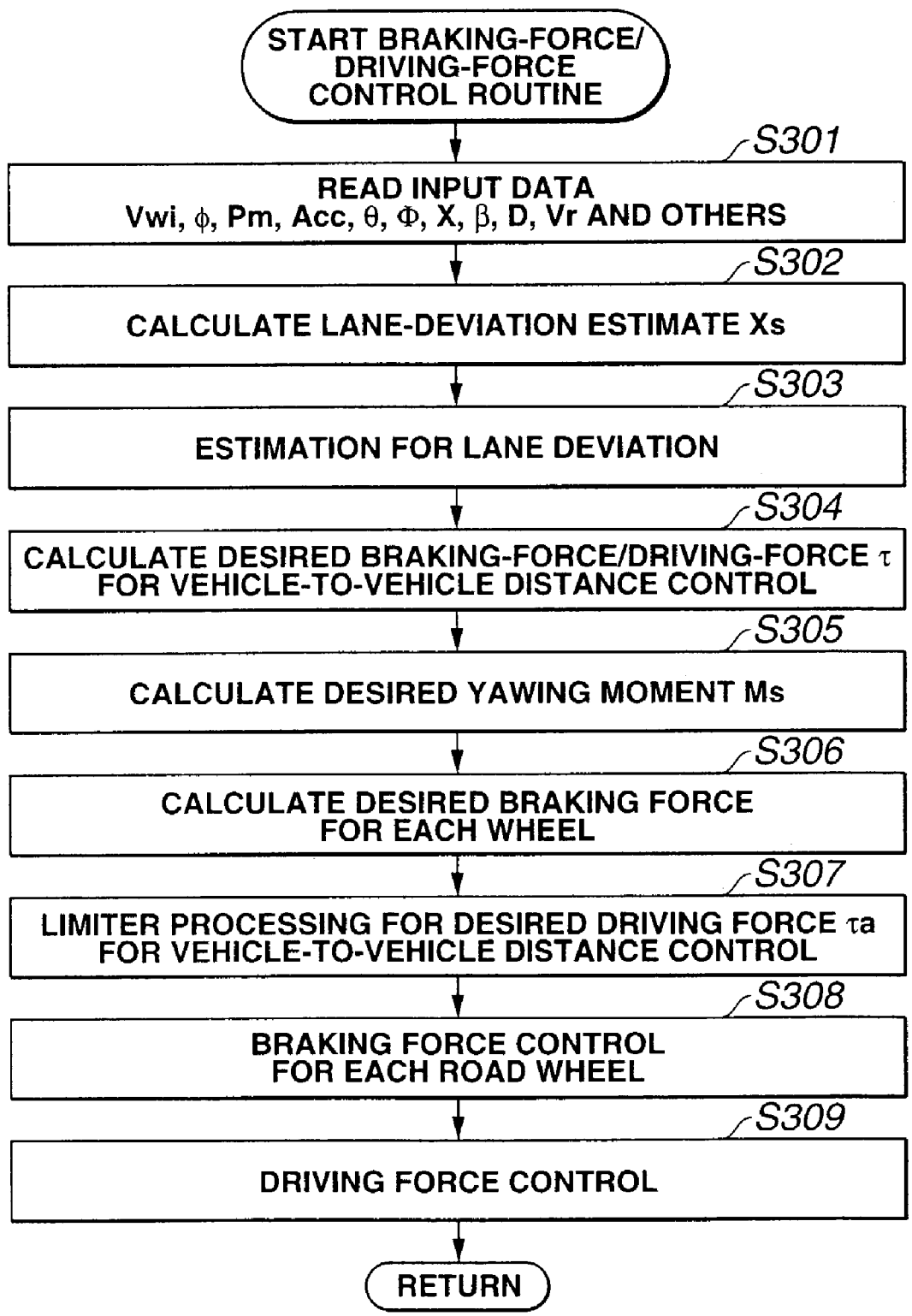

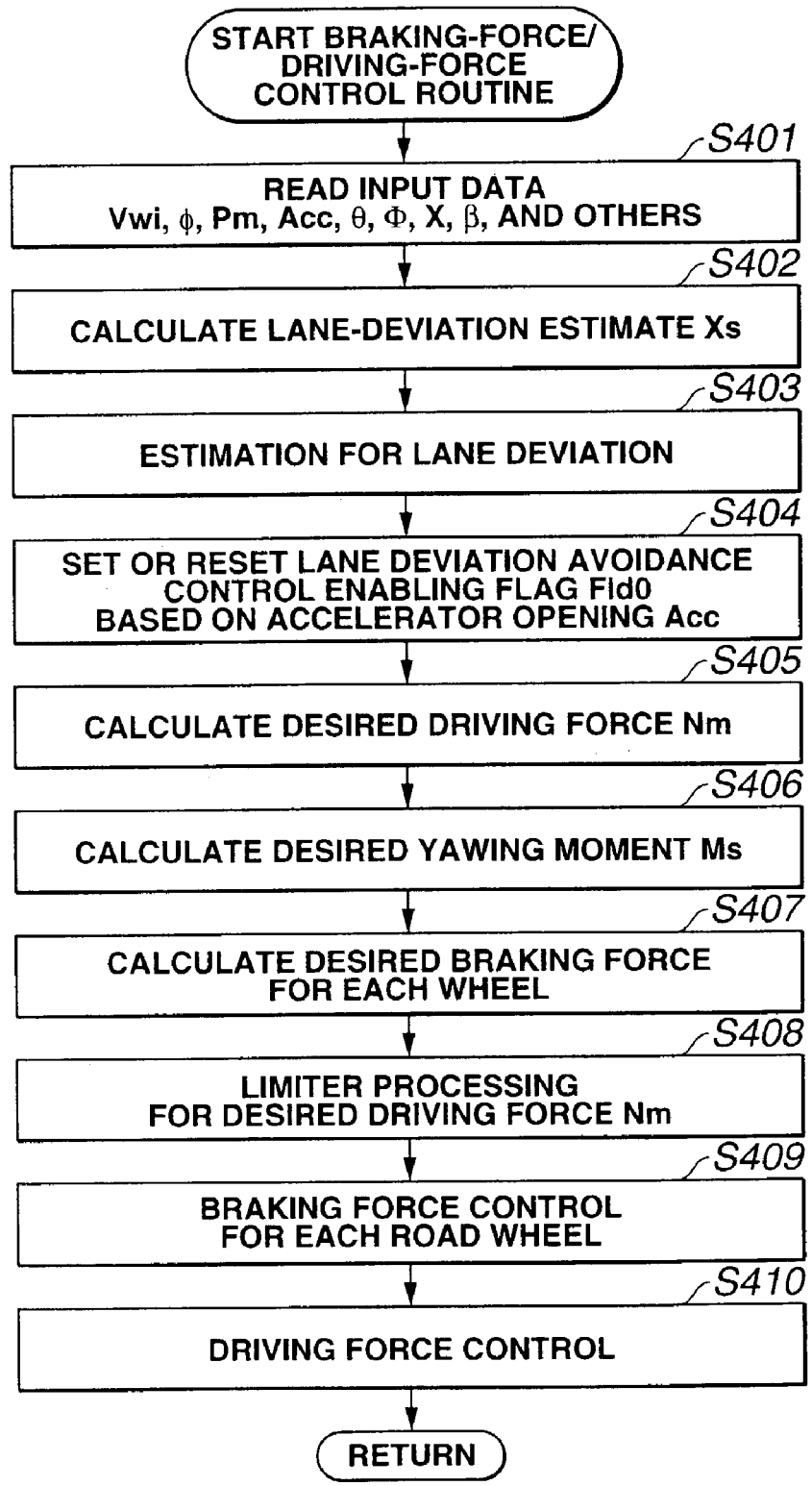

AUTOMOTIVE LANE DEVIATION AVOIDANCE SYSTEM

TECHNICAL FIELD

The present invention relates to an automotive lane deviation avoidance system for a so-called adaptive cruise control (ACC) system equipped vehicle, and specifically to the improvement of techniques for preventing an ACC vehicle (a host vehicle) from deviating from the driving lane.

BACKGROUND ART

In recent years, there have been proposed and developed various lane deviation avoidance systems for adaptive cruise control (ACC) system equipped vehicles. One way to prevent or avoid lane deviation of such an ACC vehicle is to actively apply braking forces to road wheels in such a manner that a yawing moment acts on the vehicle in the direction that lane deviation is prevented. One such lane deviation avoidance system has been disclosed in Japanese Patent Provisional Publication No. 2000-33860 (hereinafter is referred to as "JP2000-33860"). The lane deviation avoidance system has a controller that executes lane deviation avoidance control so that braking forces are applied to respective road wheels on the opposite side to the direction of lane deviation, when the ACC vehicle is apt to deviate from the driving lane.

SUMMARY OF THE INVENTION

However, the lane deviation avoidance system disclosed in JP2000-33860 produces a yawing moment needed for lane deviation avoidance by applying braking forces to either left road wheels or right road wheels during lane deviation avoidance control. Such braking-force application means the occurrence of vehicle deceleration. On ACC vehicles employing both (i) a vehicle-to-vehicle distance control system that controls the host vehicle's speed and the host vehicle's distance from a preceding vehicle and (ii) a cruise control system (or a constant-speed control system) that maintains a constant speed for a driver, there is a possibility that the braking force control executed during the lane deviation avoidance control mode and the driving force control executed during the vehicle-to-vehicle distance control mode or during the cruise control are mutually interfered with each other. More concretely, when the vehicle speed drops due to braking-force application for lane deviation avoidance, the value of the controlled variable (or the controlled quantity) for driving force control tends to increase so as to compensate for the vehicle-speed drop. In other words, the engine tends to rev up, while applying the brakes, owing to the mutual interference between lane deviation avoidance control and vehicle-to-vehicle distance control (or constant-speed control).

Accordingly, it is an object of the invention to provide an automotive lane deviation avoidance system, which avoids the aforementioned mutual interference between driving force control performed the vehicle-to-vehicle distance control system or the cruise control system and braking force control performed by the lane deviation avoidance system, during the lane deviation avoidance control mode.

In order to accomplish the aforementioned and other objects of the present invention, an automotive lane deviation avoidance system comprises a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane, and the control unit putting a priority on the lane deviation avoidance control by limiting a driving force acting on the host vehicle, when there is the possibility of the host vehicle's lane deviation from the driving lane.

According to another aspect of the invention, an automotive lane deviation avoidance system comprises a driving torque controller that controls a driving force acting on the host vehicle, and a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane, the control unit comprising (i) a lane deviation estimation section that estimates the presence or absence of the possibility of the host vehicle's lane deviation from the driving lane, (ii) a lane deviation avoidance control section that executes the lane deviation avoidance control in the presence of the possibility of the host vehicle's lane deviation from the driving lane, and (iii) a driving force limit section that limits a value of a controlled variable of the driving force controlled by the driving torque controller in the presence of the possibility of the host vehicle's lane deviation from the driving lane.

According to a further aspect of the invention, an automotive lane deviation avoidance system comprises an accelerator opening sensor that detects an accelerator opening corresponding to a manipulated variable of a driver's accelerator-pedal depression, and a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane, the control unit comprising (i) a lane deviation estimation section that estimates the presence or absence of the possibility of the host vehicle's lane deviation from the driving lane, (ii) a lane deviation avoidance control section that executes the lane deviation avoidance control in the presence of the possibility of the host vehicle's lane deviation from the driving lane, (iii) a comparison section that compares the accelerator opening to a predetermined criterion to determine whether the accelerator opening is greater than or equal to the predetermined criterion, and (iv) a lane deviation avoidance control limit section that limits the lane deviation avoidance control when the accelerator opening is greater than or equal to the predetermined criterion.

According to a still further aspect of the invention, an automotive lane deviation avoidance system comprises a driving force control means for controlling a driving force acting on the host vehicle, and a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane, the control unit comprising (i) a lane deviation estimation means for estimating the presence or absence of the possibility of the host vehicle's lane deviation from the driving lane, (ii) a lane deviation avoidance control means for executing the lane deviation avoidance control in the presence of the possibility of the host vehicle's lane deviation from the driving lane, and (iii) a driving force limit means for limiting a value of a controlled variable of the driving force controlled by the driving force control means in the presence of the possibility of the host vehicle's lane deviation from the driving lane.

According to another aspect of the invention, an automotive lane deviation avoidance system comprises an accelerator opening detection means for detecting an accelerator opening corresponding to a manipulated variable of a driver's accelerator-pedal depression, and a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane, the control unit comprising (i) a lane deviation estimation means for estimating the presence or absence of the possibility of the host vehicle's lane deviation from the driving lane, (ii) a lane deviation avoidance control means for executing the lane deviation avoidance control in the presence of the possibility of the host vehicle's lane deviation from the driving lane, (iii) a comparison means for comparing the accelerator opening to a predetermined criterion to determine whether the accelerator opening is greater than or equal to the predetermined criterion, and (iv) a lane deviation avoidance control limit means for limiting the lane deviation avoidance control when the accelerator opening is greater than or equal to the predetermined criterion.

According to another aspect of the invention, a method of avoiding an adaptive cruise control system equipped vehicle from deviating from a driving lane, the adaptive cruise control system equipped vehicle employing both a driving force control system, which controls a driving force acting on a host vehicle, and a braking force control system, which controls a braking force for every road wheel, the method comprises detecting an accelerator opening corresponding to a manipulated variable of a driver's accelerator-pedal depression, estimating the presence or absence of a possibility of the host vehicle's lane deviation from the driving lane, calculating a desired driving force based on the accelerator opening, calculating a desired yawing moment acting on the host vehicle in a direction that avoids the host vehicle from deviating from the driving lane, calculating a value of a controlled variable of a braking force for every road wheel based on the desired yawing moment, executing a host vehicle's lane deviation avoidance control via the braking force control system in the presence of the possibility of the host vehicle's lane deviation from the driving lane, and simultaneously limiting the desired driving force via the driving force control system in the presence of the possibility of the host vehicle's lane deviation from the driving lane.

According to another aspect of the invention, a method of avoiding an adaptive cruise control system equipped vehicle from deviating from a driving lane, the adaptive cruise control system equipped vehicle employing both a driving force control system, which controls a driving force acting on a host vehicle, and a braking force control system, which controls a braking force for every road wheel, the method comprises estimating the presence or absence of a possibility of the host vehicle's lane deviation from the driving lane, detecting a vehicle-to-vehicle distance between a preceding vehicle relative to the host vehicle, calculating a value of a controlled variable of either of a braking force and a driving force applied to the host vehicle based on the vehicle-to-vehicle distance, calculating a desired yawing moment acting on the host vehicle in a direction that avoids the host vehicle from deviating from the driving lane, calculating a value of a controlled variable of a braking force for every road wheel based on the desired yawing moment and the value of the controlled variable of the braking force, executing a vehicle-to-vehicle distance control in which the vehicle-to-vehicle distance between the host vehicle and the preceding vehicle is controlled responsively to the value of the controlled variable of either of the braking force and the driving force, executing a host vehicle's lane deviation avoidance control via the braking force control system in the presence of the possibility of the host vehicle's lane deviation from the driving lane, and simultaneously limiting the value of the controlled variable of the driving force via the driving force control system in the presence of the possibility of the host vehicle's lane deviation from the driving lane.

According to another aspect of the invention, a method of avoiding an adaptive cruise control system equipped vehicle from deviating from a driving lane, the adaptive cruise control system equipped vehicle employing both a driving force control system, which controls a driving force acting on a host vehicle, and a braking force control system, which controls a braking force for every road wheel, the method comprises detecting an accelerator opening corresponding to a manipulated variable of a driver's accelerator-pedal depression, estimating the presence or absence of a possibility of the host vehicle's lane deviation from the driving lane, determining, based on a result of comparison between the accelerator opening and a predetermined criterion, whether a host vehicle's lane deviation avoidance control should be enabled or disabled, to set a lane deviation avoidance control enabling flag when the accelerator opening is less than the predetermined criterion and thus the lane deviation avoidance control is enabled and to reset the lane deviation avoidance control enabling flag when the accelerator opening is greater than or equal to the predetermined criterion and thus the lane deviation avoidance control is disabled, calculating a desired driving force based on the accelerator opening, calculating a desired yawing moment acting on the host vehicle in a direction that avoids the host vehicle from deviating from the driving lane, calculating a value of a controlled variable of a braking force for every road wheel based on the desired yawing moment, executing a host vehicle's lane deviation avoidance control via the braking force control system, while simultaneously limiting the desired driving force via the driving force control system in the presence of the possibility of the host vehicle's lane deviation from the driving lane, and inhibiting the lane deviation avoidance control irrespective of the presence or absence of the possibility of the host vehicle's lane deviation from the driving lane when the lane deviation avoidance control enabling flag is reset.

The other objects and features of this invention will become understood from the following description with reference to the accompanying drawings.

BRIEF DESCRIPTION OF THE DRAWINGS

FIG. 2 is a flow chart showing one braking-force/driving-force control routine executed by a braking-force/driving-force controller incorporated in the lane deviation avoidance system of the embodiment shown in FIG. 1.

FIG. 3 is a flow chart showing a first modification of the braking-force/driving-force control routine executed by the braking-force/driving-force controller incorporated in the lane deviation avoidance system of the embodiment.

FIG. 4 is a flow chart showing a second modification of the braking-force/driving-force control routine executed by the braking-force/driving-force controller incorporated in the lane deviation avoidance system of the embodiment.

DESCRIPTION OF THE PREFERRED EMBODIMENTS

Figure 1:
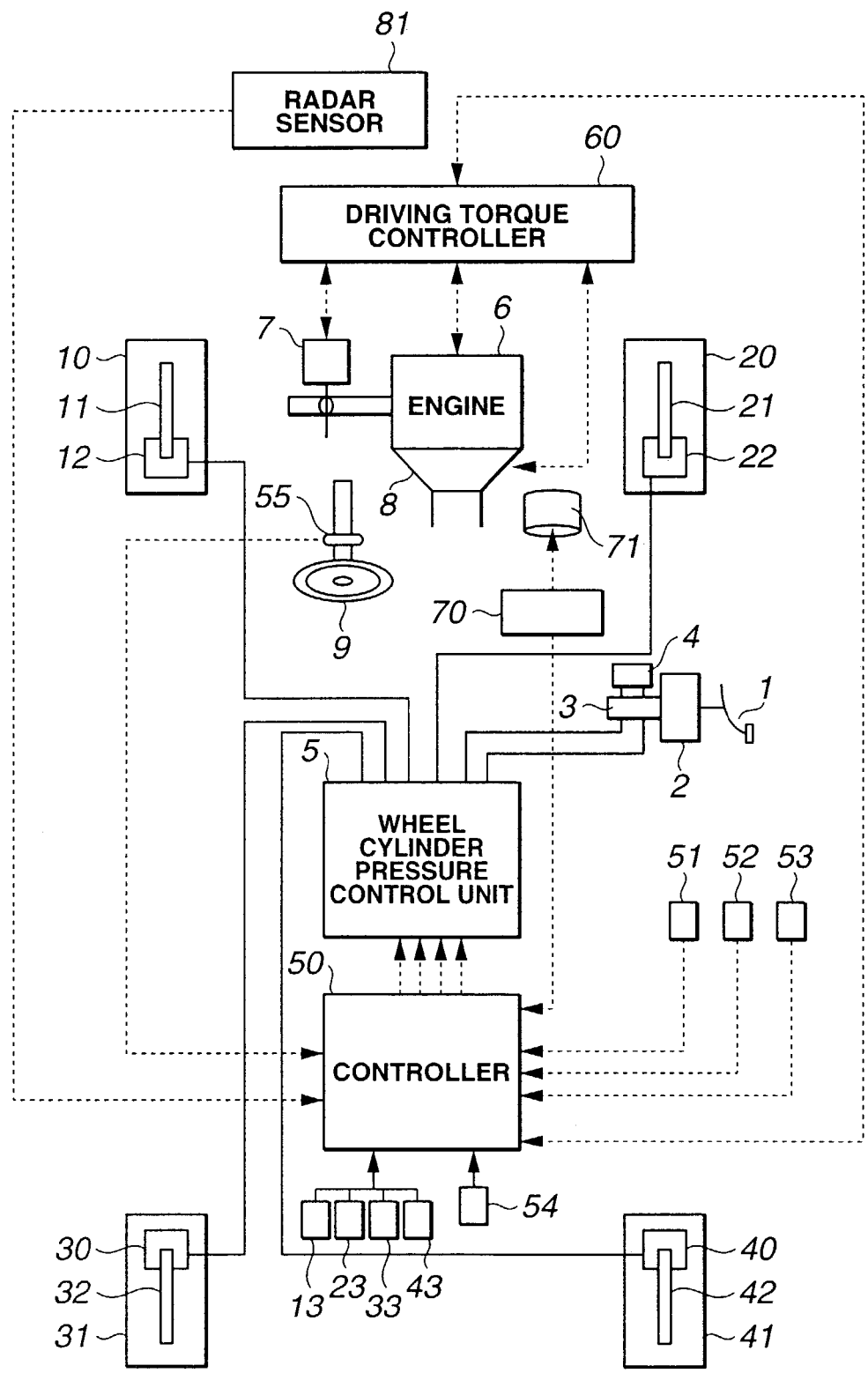
FIG. 1 is a system block diagram illustrating one embodiment of a lane deviation avoidance system.

Referring now to the drawings, particularly to FIG. 1, the lane deviation avoidance system of the embodiment is exemplified in an adaptive cruise control (ACC) system equipped rear-wheel-drive vehicle employing an automatic transmission and a rear differential. In the shown embodiment, as a braking force control system that regulates hydraulic brake pressures of individual wheel-brake cylinders (i.e., front-left, front-right, rear-left, and rear-right wheel-brake cylinders) independently of each other, a four-channel braking control system such as a four-channel ABS system is used. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Reference signs 11, 21, 31, and 41 respectively denote a front-left-wheel brake disk for a front-left road wheel 10, a front-right-wheel brake disk for a front-right road wheel 20, a rear-left-wheel brake disk for a rear-left road wheel 30, and a rear-right-wheel brake disk for a rear-right road wheel 40. Front-left road wheel 10, front-right road wheel 20, rear-left road wheel 30, and rear-right road wheel 40 are equipped with respective wheel-brake cylinders 12, 22, 32, and 42. Applying hydraulic pressure to a piston in each of wheel-brake cylinders 12, 22, 32, and 42 causes the brake disk to be clamped between a pair of pads or flat shoes and whereby a braking force is applied to ach of road wheels 10, 20, 30, and 40. Front-left, front-right, rear-left, and rear-right wheel-brake cylinder pressures are regulated independently of each other by means of a wheel cylinder pressure control unit (or a hydraulic modulator) 5. Wheel cylinder pressure control unit 5 includes hydraulic pressure control actuators respectively associated with first-channel (front-left), second-channel (front-right), third-channel (rear-left), and fourth-channel (rear-right) brake circuits. Each of the hydraulic pressure control actuators is comprised of a proportional solenoid valve such as an electromagnetically-controlled solenoid valve that regulates the wheel-brake cylinder pressure to a desired fluid-pressure level. Each of the hydraulic modulator electromagnetically-controlled solenoid valves of wheel cylinder pressure control unit 5 is responsive to a command signal from an electronic braking-force/driving-force controller (or an electronic braking-force and driving-force control unit) 50 so as to regulate the required braking. Concretely, the actuation of the solenoid valves by controller 50 connects the individual wheel-brake cylinders 12, 22, 32, and 42 with either the corresponding hydraulic circuit of the master cylinder 3, or with a return pump. Electronic braking-force/driving-force controller 50 generally comprises a microcomputer that includes a central processing unit (CPU) or a microprocessor (MPU), memories (RAM, ROM), and an input/output interface (I/O). The input/output interface (I/O) receives input information from various engine/vehicle switches and sensors, such as a yaw rate sensor 51, a front-left wheel-speed sensor 13, a front-right wheel-speed sensor 23, a rear-left wheel-speed sensor 33, a rear-right wheel-speed sensor 43, a master cylinder pressure sensor 52, an accelerator opening sensor 53, a direction indicator switch 54, a steering angle sensor 55, a radar sensor 81, and the like. Yaw rate sensor 51 is provided to detect a yaw rate $\phi$ resulting from a yawing moment acting on the vehicle. Front-left, front-right, rear-left, and rear-right wheel-speed sensors 13, 23, 33, and 43 are provided to detect front-left, front-right, rear-left, and rear-right wheel speeds $Vw_{FL}$, $Vw_{FR}$, $Vw_{RL}$, and $Vw_{RR}$, which are collectively referred to as "Vwi". Master cylinder pressure sensor 52 is provided to estimate or detect the amount of depression of brake pedal 1 by measuring or monitoring a master cylinder pressure Pm. Accelerator opening sensor 53 is provided to estimate or detect an accelerator opening Acc corresponding to a manipulated variable of the driver's accelerator-pedal depression when the vehicle driver depresses an accelerator pedal. As clearly seen in FIG. 1, the lane deviation avoidance system of the embodiment also includes a monocular camera 71 and a camera controller 71 as an external recognizing sensor, which functions to detect a position of the ACC vehicle (host vehicle) within the driving lane (the host vehicle's traffic lane), and whose sensor signal is used for the lane deviation avoidance control. The current position of the host vehicle within the host vehicle's lane is determined by a picture image of monocular camera 71. Actually, latest up-to-date information data concerning the current position of the host vehicle within the host vehicle's lane, that is, a yaw angle $\Phi$ of the host vehicle, a lateral displacement or a lateral deviation X from a central axis of the host vehicle's lane, and a curvature $\beta$ of the current driving lane (the host vehicle's lane) are input into braking-force/driving-force controller 50. A signal from direction indicator switch 54 and/or a steering-angle indicative signal $\theta$ from steering angle sensor 55 is used to determine the presence or absence of a driver's intention for lane changing. Radar sensor 81 such as a scanning laser radar sensor, is used as an object detector 31 that captures, recognizes, senses or detects the preceding vehicle (or relevant target vehicle) or a frontally running vehicle, and to monitor a vehicle-to-vehicle distance D (or an inter-vehicle distance or a separating distance between the host vehicle and the preceding vehicle) or a relative distance of the preceding vehicle relative to the host vehicle, and to monitor a relative velocity Vr of the host vehicle relative to the preceding vehicle. That is, radar sensor 81 serves as a relative-distance detector (a vehicle-to-vehicle distance detector) as well as a relative-velocity detector. As is generally known, the scanning laser radar sensor includes a scanning device, containing both a transmitter and a receiver. The scanning device of the laser radar sensor transmits a pulse of light (laser beam) in a horizontal line, back and forth. The scanning device measures the time of flight of the pulse of light, and then the relative distance or the inter-vehicle distance is calculated on the basis of the time interval from the transmitted pulse (the time when the laser beam is emitted from the host vehicle) to the received pulse (the time when the receiver receives the laser wave reflected from the preceding vehicle). Instead of the use of the scanning laser radar, a millimeter-wave radar sensor may be used for object detection. In lieu thereof, by image-processing image data of a stereo camera using a charge-coupled device (CCD) image sensor, the system is able to determine the host vehicle's distance from the preceding vehicle, that is, the relative distance between the host vehicle and the preceding vehicle, and relative velocity. Additionally, for mutual communication via a data link (a plurality of signal lines), braking-force/driving-force controller 50 is electrically connected to a driving torque controller 60 that controls a driving torque for each driving wheel. In more detail, in order to control the driving torque for each driving wheel, driving torque controller 60 performs at least one of engine control during which a fuel-injection amount to be injected into each individual engine cylinder of an internal combustion engine 6 is controlled, throttle control during which a throttle opening is controlled or adjusted by means of a throttle control device or a throttle valve actuator 7, and automatic shift control during which an automatic transmission 8 is automatically up-shifted or down-shifted. Within the controllers, the central processing units (CPUs) allow the access by the I/O interface of input informational data signals from engine/vehicle switches and sensors, and are responsible for carrying various control programs stored in the memories and capable of performing necessary arithmetic and logic operations. As discussed above, the engine/vehicle switches and sensors are provided to detect or monitor specific operating conditions on the engine or vehicle. Computational results or arithmetic calculation results, in other words, calculated output signals or control signals are relayed via the output interface circuitries of the controllers to output stages, for example, the shift valves of automatic transmission 8, fuel injectors, electronically-controlled throttle valve actuator 7, and the solenoid valves of wheel cylinder pressure control unit (hydraulic modulator) 5.

The braking-force/driving-force control routine executed by controller 50 is hereunder described in detail in reference to the flow chart shown in FIG. 2. The braking-force/driving-force control routine shown in FIG. 2 is executed as time-triggered interrupt routines to be triggered every predetermined intervals such as 10 milliseconds.

At step S201, more recent input informational data received from various sensor systems 13, 23, 33, 43, 51, 52, 53, 54, and 55, and controllers 60 and 70, that is, $Vw_{FL}$, $Vw_{FR}$, $Vw_{RL}$, $Vw_{RR}$, $\phi$, Pm, Acc, the direction indicator switch data signal, $\theta$, the information data regarding the current driving torque, $\Phi$ (the host vehicle's yaw angle), X (the lateral deviation from the central axis of the host vehicle's lane), and $\beta$ (the curvature of the host vehicle's lane) are read. Within camera controller 70, the processor image-processes the forward picture image based on image data from monocular camera 71, and then extracts and recognizes the borderline of the forward line such as a white warning line or a centerline, thereby computing or determining the host vehicle's yaw angle $\Phi$, the lateral deviation X from the central axis of the host vehicle's lane, and the curvature $\beta$ of the host vehicle's lane.

At step S202, an estimate Xs of lane deviation is estimated or arithmetically calculated based on the host vehicle's yaw angle $\Phi$ with respect to the direction of the current driving lane (the host vehicle's lane), the lateral deviation X from the central axis of the host vehicle's lane, the curvature $\beta$ of the host vehicle's lane, and a vehicle speed V, from the following expression (1).

$$Xs = Tt \times V(\Phi + Tt \times V \times \beta) + X \tag{1}$$

where Tt denotes a headway between the host vehicle and the preceding vehicle both driving in the same sense and in the same lane.

In the shown embodiment, the previously-noted vehicle speed V is arithmetically calculated based on the wheel speed data Vwi, as a mean value of the front wheel speed data $Vw_{FL}$ (=Vw1) and $Vw_{FR}$ (=Vw2), from the following expression (2).

$$V = (Vw1 + Vw2)/2 \tag{2}$$

If the ABS system of the ACC vehicle is in operation, a so-called pseudo vehicle speed, which is mainly used to estimate a slip rate within the processor of the ABS system, may be regarded as vehicle speed V.

At step S203, a check for lane deviation is made, based on a comparison result between lane-deviation estimate Xs and a predetermined lane-deviation criterion Xc, to estimate or determine whether or not the host vehicle is apt to deviate from its driving lane. When lane-deviation estimate Xs is greater than or equal to predetermined criterion Xc, that is, in case of $Xc \leq Xs$, the processor of controller 50 determines that the host vehicle is apt to deviate from the driving lane toward the right-hand side neighboring lane, and thus a lane-deviation decision flag Fld is set (Fld=1). When lane-deviation estimate Xs is less than or equal to a negative value $-Xc$ of predetermined criterion Xc, that is, in case of $Xs \leq -Xc$, the processor of controller 50 determines that the host vehicle is apt to deviate from the driving lane toward the left-hand side neighboring lane, and thus lane-deviation decision flag Fld is also set (Fld=1). In contrast to the above, when lane-deviation estimate Xs is less than predetermined criterion Xc and greater than the negative value $-Xc$ of predetermined criterion Xc, that is, in case of $-Xc < Xs < Xc$, the processor of controller 50 determines that the host vehicle does not deviate from the driving lane, and thus lane-deviation decision flag Fld is reset (Fld=0). An intentional lane-deviation check based on the presence or absence of a driver's intention for lane changing may be combined with the lane-deviation check based on comparison between lane-deviation estimate Xs and predetermined criterion Xc. The presence or absence of the driver's intention for lane changing can be determined based on the signal from direction indicator switch 54 and/or steering-angle indicative signal $\theta$ from steering angle sensor 55. Concretely, when direction indicator switch 54 is turned ON and the direction indicated by direction indicator switch 54 is identical to the lane-deviation direction based on comparison between lane-deviation estimate Xs and predetermined criterion Xc, the processor of controller 50 determines that the current lane changing operation is based on the driver's intention for lane changing. In such a case, the host vehicle's lane-deviation decision flag Fld is changed from the set state (Fld=1) to the reset state (Fld=0). On the contrary, when direction indicator switch 54 is turned ON and the direction indicated by direction indicator switch 54 is not identical to the lane-deviation direction based on comparison between lane-deviation estimate Xs and predetermined criterion Xc, the processor of controller 50 determines that there is an increased tendency for the host vehicle to deviate from the driving lane. In this case, lane-deviation decision flag Fld remains set (Fld=1). When the steering wheel is steered by the driver with direction indicator switch 54 turned OFF and additionally steering angle $\theta$ is greater than or equal to a predetermined steering-angle threshold value, the processor of controller 50 determines that the current lane changing operation is based on the driver's intention for lane changing. Therefore, lane-deviation decision flag Fld is changed from the set state (Fld=1) to the reset state (Fld=0).

At step S204, a desired driving force Nm (substantially corresponding to a desired throttle opening) is arithmetically calculated based on accelerator opening Acc read through step S201.

At step S205, a desired yawing moment Ms, that is, a desired value of yawing moment to be applied to the host vehicle for lane deviation avoidance (in other words, a desired yawing moment to be applied for vehicle dynamic behavior change in the direction that avoids the lane deviation), is computed or arithmetically calculated based on both the lane-deviation estimate Xs and predetermined lane-deviation criterion Xc and also determined depending on whether lane-deviation decision flag Fld is set or reset, as follows.

In case that lane-deviation decision flag Fld is set (Fld=1), desired yawing moment Ms is calculated based on lane-deviation estimate Xs and predetermined lane-deviation criterion Xc from the following expression (3).

$$Ms = -K1 \times K2(Xs - Xc) \tag{3}$$

where K1 is a constant, and K2 is a gain (a variable) that varies depending on the vehicle speed.

In case that lane-deviation decision flag Fld is reset (Fld=0), desired yawing moment Ms is calculated from the following expression (4).

$$Ms = 0 \tag{4}$$

At step S206, a desired braking force (substantially corresponding to a desired wheel-brake cylinder pressure Ps in each of wheel-brake cylinders 12, 22, 32, and 42) to be applied to each road wheel is arithmetically calculated based on desired yawing moment Ms calculated through step S205 and master cylinder pressure Pm sensed by master cylinder pressure sensor 52. As described hereunder in detail, desired wheel-brake cylinder pressures Ps (that is, a desired front-left wheel-brake cylinder pressure Ps_fl, a desired front-right wheel-brake cylinder pressure Ps_fr, a desired rear-left wheel-brake cylinder pressure Ps_rl, and a desired rear-right wheel-brake cylinder pressure Ps_rr) in wheel-brake cylinders 12, 22, 32, and 42 are calculated based on the result of comparison between the absolute value |Ms| of desired yawing moment Ms and a predetermined yawing-moment threshold value Ms0. More concretely, when the absolute value |Ms| of desired yawing moment Ms is less than predetermined yawing-moment threshold value Ms0, that is, in case of |Ms|<Ms0, the processor of controller 50 calculates the four desired wheel-brake cylinder pressures Ps_fl, Ps_fr, Ps_rl, and Ps_rr, in such a manner as to produce the difference of braking force between rear-left and rear-right road wheels 30 and 40. Conversely when the absolute value |Ms| of desired yawing moment Ms is greater than or equal to predetermined yawing-moment threshold value Ms0, that is, in case of |Ms|≧Ms0, the processor of controller 50 calculates the four desired wheel-brake cylinder pressures Ps_fl, Ps_fr, Ps_rl, and Ps_rr, in such a manner as to produce the difference of braking force between front-left and front-right road wheels 10 and 20 as well as the difference of braking force between rear-left and rear-right road wheels 30 and 40. As hereunder described in detail, according to the system of the embodiment, the yawing moment, which acts on the host vehicle in the direction that avoids the host vehicle's lane deviation from its driving lane, can be produced by way of a wheel-brake cylinder pressure difference ΔPs between left and right wheel-brake cylinder pressures, thus avoiding the lane deviation tendencies without using the steering device.

First, (i) a desired front wheel-brake cylinder pressure difference ΔPs_f between desired front-left and front-right wheel-brake cylinder pressures Ps_fl and Ps_fr and (ii) a desired rear wheel-brake cylinder pressure difference ΔPs_r between desired rear-left and rear-right wheel-brake cylinder pressures Ps_rl and Ps_rr are arithmetically calculated based on desired yawing moment Ms, from the following expressions (5), (6), (7), and (8).

In case of Fld=1 and |Ms|<Ms0, desired front wheel-brake cylinder pressure difference ΔPs_f and desired rear wheel-brake cylinder pressure difference ΔPs_r are calculated from the expressions (5) and (6).

$$\Delta Ps\_f = 0 \tag{5}$$

$$\Delta Ps\_r = 2 \times Kb\_r \times |Ms|/T \tag{6}$$

In case of Fld=1 and |Ms|≧Ms0, desired front wheel-brake cylinder pressure difference ΔPs_f and desired rear wheel-brake cylinder pressure difference ΔPs_r are calculated from the expressions (7) and (8).

$$\Delta Ps\_f = 2 \times Kb\_f(|Ms| - Ms0)/T \tag{7}$$

$$\Delta Ps\_r = 2 \times Kb\_r \times Ms0/T \tag{8}$$

where T is a tread, Kb_f is a conversion factor needed to convert the front-wheel braking force to the front wheel-brake cylinder pressure and Kb_r is a conversion factor needed to convert the rear-wheel braking force to the rear wheel-brake cylinder pressure, and these conversion factors Kb_f and Kb_r are determined by the specification of the braking system.

Second, taking into account both the direction of lane deviation of the host vehicle from the driving lane and master cylinder pressure Pm created by the driver's brake-pedal depression, the four desired wheel-brake cylinder pressures Ps_fl, Ps_fr, Ps_rl, and Ps_rr are arithmetically calculated from the following expressions (9)–(18).

In case of Fld=1 and the lane deviation to the left, the four desired wheel-brake cylinder pressures Ps_fl, Ps_fr, Ps_rl, and Ps_rr are calculated from the expressions (9), (10), (11) and (12).

$$Ps\_fl = Pm \tag{9}$$

$$Ps\_fr = Pm + \Delta Ps\_f \tag{10}$$

$$Ps\_rl = Pm\_r \tag{11}$$

$$Ps\_rr = Pm\_r + \Delta Ps\_r \tag{12}$$

In case of Fld=1 and the lane deviation to the right, the four desired wheel-brake cylinder pressures Ps_fl, Ps_fr, Ps_rl, and Ps_rr are calculated from the expressions (13), (14), (15) and (16).

$$Ps\_fl = Pm + \Delta Ps\_f \tag{13}$$

$$Ps\_fr = Pm \tag{14}$$

$$Ps\_rl = Pm\_r + \Delta Ps\_r \tag{15}$$

$$Ps\_rr = Pm\_r \tag{16}$$

In case of Fld=0, the four desired wheel-brake cylinder pressures Ps_fl, Ps_fr, Ps_rl, and Ps_rr are calculated from the expressions (17) and (18).

$$Ps\_fl = Ps\_fr = Pm \tag{17}$$

$$Ps\_rl = Ps\_rr = Pm\_r \tag{18}$$

where Pm_r is a rear-wheel master cylinder pressure for the rear hydraulic brake section and determined taking account of the pressure distribution between the brake-fluid pressure to the front wheel brakes and the brake-fluid pressure to the rear wheel brakes, according to a predetermined pressure distribution characteristic.

At step S207, a limiter processing is made to the desired driving force Nm (calculated through step S204) depending on lane-deviation decision flag Fld, so as to prevent a command signal value corresponding to the desired driving force from exceeding a specified level and to derive or calculate a final desired driving force Ns limited to a value less than the specified level, as follows.

In case of Fld=1, final desired driving force Ns is calculated from the following expression (19)

$$Ns=Nm-Ns0 \quad (19)$$

where Ns0 denotes a reduced amount for the desired driving force. In case of Fld=1, final desired driving force Ns may be limited to a fixed value such as "0", that is, Ns=0, instead of using the expression (19).

Conversely in case of Fld=0, desired driving force Nm (calculated through step S204) is set directly to final desired driving force Ns as can be seen from the following expression (20).

$$Ns=Nm \quad (20)$$

In a transition period from a state of Fld=1 (see the expression (19)) to a state of Fld=0 (see the expression (20)), desired-driving-force reduced amount Ns0 may be decreasingly controlled gradually to "0" so as to gradually increase the value of the controlled variable for driving force control and to ensure a smooth transition from the braking force control mode for lane deviation avoidance to the driving force control mode for vehicle-to-vehicle distance control (or cruise control). Alternatively, assuming that final desired driving force Ns is fixed to a certain value such as "0" in case of Fld=1, in presence of the transition from Fld=1 (see the expression (19)) to Fld=0 (see the expression (20)), final desired driving force Ns may be gradually increased up to desired driving force Nm.

At step S208, the wheel-brake cylinder pressure in each of wheel-brake cylinders 12, 22, 32, and 42 is generated or produced by means of hydraulic modulator 5 responsively to the desired wheel-brake cylinder pressure Ps calculated through step S206 so as to achieve independent braking force control for each road wheel.

At step S209, the driving force is generated or produced by engine 6 whose driving torque is controlled by means of driving torque controller 60, responsively to the final desired driving force Ns calculated through step S207.

As set forth above, according to the lane deviation avoidance system of the embodiment that executes the braking-force/driving-force control routine shown in FIG. 2, when there is a possibility of the host vehicle's lane deviation from the driving lane, the value of the controlled variable for driving force control can be properly limited (see step S207 of FIG. 2) so that the lane deviation avoidance control holds priority over the driving force control. Therefore, it is possible to prevent undesired mutual interference between the host vehicle's driving force control system and the lane deviation avoidance system with braking force control system interaction, in other words, mutual interference between the braking force produced for lane deviation avoidance and the driving force (or the driving torque) unintentionally produced for vehicle-to-vehicle distance control (or cruise control), thus preferentially avoiding the host vehicle's lane-deviation tendencies. In the lane deviation avoidance system shown in FIGS. 1 and 2, step S203 (exactly, steps S202 and S203) functions as a host vehicle's lane deviation tendencies estimation means (simply, a lane deviation estimation means). Step S207 functions as a driving force limit means. Braking-force/driving-force controller 50 functions as an integrated lane deviation avoidance control means. Driving torque controller 60 functions as a driving force control means.

Referring now to FIG. 3, there is shown the first modification of the braking-force/driving-force control routine. The braking-force/driving-force control routine of the first modification shown in FIG. 3 is also executed as time-triggered interrupt routines to be triggered every predetermined intervals such as 10 milliseconds. The modified routine of FIG. 3 is similar to the routine of FIG. 2, except that, in the modified routine of FIG. 3, the value of the controlled variable for host vehicle's braking-force/driving-force control is arithmetically calculated based on a vehicle-to-vehicle distance D (a relative distance of the preceding vehicle relative to the host vehicle).

At step S301, in addition to more recent input informational data received from various sensor systems 13, 23, 33, 43, 51, 52, 53, 54, and 55, and controllers 60 and 70, that is, $Vw_{FL}$, $Vw_{FR}$, $Vw_{RL}$, $Vw_{RR}$, $\phi$, Pm, Acc, the direction indicator switch data signal, $\theta$, the information data regarding the current driving torque, $\Phi$ (the host vehicle's yaw angle), X (the lateral deviation from the central axis of the host vehicle's lane), and $\beta$ (the curvature of the host vehicle's lane), more recent information data regarding the vehicle-to-vehicle distance D and relative velocity Vr of the host vehicle relative to the preceding vehicle, both monitored by radar sensor 81, are read. Additionally, within camera controller 70, the processor image-processes the forward picture image based on image data from monocular camera 71, and then extracts and recognizes the borderline of the forward line such as a white warning line or a centerline, thereby computing or determining the host vehicle's yaw angle $\Phi$, lateral deviation X and curvature $\beta$.

Step S302 of FIG. 3 is identical to step S202 of FIG. 2. At step S302, estimate Xs of lane deviation is estimated based on the host vehicle's yaw angle $\Phi$, lateral deviation X, curvature $\beta$, and vehicle speed V, from the expression (1), that is, $Xs=Tt \times V(\Phi+Tt \times V \times \beta)+X$.

Step S303 of FIG. 3 is identical to step S203 of FIG. 2. At step S303, a check for lane deviation is made, based on the comparison result between lane-deviation estimate Xs and predetermined lane-deviation criterion Xc, to estimate whether or not the host vehicle is apt to deviate from its driving lane.

At step S304, a host vehicle's desired braking-force/driving-force $\tau$ is arithmetically calculated based on a deviation (D−Ds) between vehicle-to-vehicle distance D and a desired vehicle-to-vehicle distance Ds. In the shown embodiment, desired vehicle-to-vehicle distance Ds is estimated or determined based on both the host vehicle's speed (vehicle speed V) and a so-called vehicle-to-vehicle time corresponding to a time-to-collision that represents an elapsed time before the host vehicle is brought into collision-contact with the preceding vehicle. Concretely, desired braking-force/driving-force $\tau$ is calculated based on deviation (D−Ds) between vehicle-to-vehicle distance D and desired vehicle-to-vehicle distance Ds, from the following expression for one of various types of feedback control, for example, proportional-plus-derivative control (PD control) in which the control signal is a linear combination of the error signal and its derivative.

$$\tau=Kp(D-Ds)+Kd(dD/dt-dDs/dt)$$

where Kp is a first feedback gain (exactly, a proportional gain), Kd is a second feedback gain (exactly, a derivative gain), and dD/dt corresponds to relative velocity Vr of the host vehicle relative to the preceding vehicle.

At the last stage of step S304, desired braking-force/driving-force is converted into a desired driving force τa and a desired braking force τd, depending on whether or not the sign of desired braking-force/driving-force τ is negative (minus).

In case of $0 \leq \tau$, the force τ is converted into desired driving force τa and desired braking force τd, as follows.

$$\tau a = \tau$$

$$\tau d = 0$$

Conversely in case of τ<0, the force τ is converted into desired driving force τa and desired braking force τd, as follows.

$$\tau a = 0$$

$$\tau d = -\tau$$

In order to permit the lane deviation avoidance control to hold priority over the vehicle-to-vehicle distance control, when the processor of controller 50 determines that the host vehicle is apt to deviate from the driving lane toward the neighboring lane and thus sets lane-deviation decision flag Fld to "1" at step S303, it is more preferable that controller 50 selects either of a suspending mode in which the vehicle-to-vehicle distance control is suspended and a canceling mode in which the vehicle-to-vehicle distance control is canceled.

Step S305 of FIG. 3 is identical to step S205 of FIG. 2. At step S305, desired yawing moment Ms is calculated based on both the lane-deviation estimate Xs and predetermined lane-deviation criterion Xc, in dependence on setting (Fld=1) or resetting (Fld=0) of lane-deviation decision flag Fld, as follows. In case of Fld=1, desired yawing moment Ms is calculated from the expression (3), that is, Ms=−K1×K2(Xs−Xc). Conversely in case of Fld=0, desired yawing moment Ms is calculated from the expression (4), that is, Ms=0.

At step S306, a desired braking force (substantially corresponding to a desired wheel-brake cylinder pressure Ps in each of wheel-brake cylinders 12, 22, 32, and 42) to be applied to each road wheel is arithmetically calculated based on desired braking force τd calculated through step S304, desired yawing moment Ms calculated through step S305, and master cylinder pressure Pm sensed by master cylinder pressure sensor 52. In the same manner as step S206, in case of |Ms|<Ms0, the processor of controller 50 calculates the four desired wheel-brake cylinder pressures Ps_fl, Ps_fr, Ps_rl, and Ps_rr, in such a manner as to produce the difference of braking force between rear-left and rear-right road wheels 30 and 40. Conversely in case of |Ms|≧Ms0, the processor of controller 50 calculates the four desired wheel-brake cylinder pressures Ps_fl, Ps_fr, Ps_rl, and Ps_rr, in such a manner as to produce the difference of braking force between front-left and front-right road wheels 10 and 20 as well as the difference of braking force between rear-left and rear-right road wheels 30 and 40.

First, (i) desired front wheel-brake cylinder pressure difference ΔPs_f and (ii) desired rear wheel-brake cylinder pressure difference ΔPs_r are arithmetically calculated based on desired yawing moment Ms, from the previously-noted expressions (5), (6), (7), and (8). That is, in case of Fld=1 and |Ms|<Ms0, desired front wheel-brake cylinder pressure difference ΔPs_f and desired rear wheel-brake cylinder pressure difference ΔPs_r are calculated from the respective expressions (5) and (6), that is, ΔPs_f=0 and ΔPs_r=2×Kb_r×|Ms|/T. On the contrary, in case of Fld=1 and |Ms|≧Ms0, desired front wheel-brake cylinder pressure difference ΔPs_f and desired rear wheel-brake cylinder pressure difference ΔPs_r are calculated from the respective expressions (7) and (8), that is, ΔPs_f=2×Kb_f(|Ms|−Ms0)/T and ΔPs_r=2×Kb_r×Ms0/T.

Second, taking into account both the direction of lane deviation of the host vehicle from the driving lane and master cylinder pressure Pm created by the driver's brake-pedal depression, the four desired wheel-brake cylinder pressures Ps_fl, Ps_fr, Ps_rl, and Ps_rr in wheel-brake cylinders 12, 22, 32, and 42 are arithmetically calculated from the following expressions (21)–(30).

In case of Fld=1 and the lane deviation to the left, the four desired wheel-brake cylinder pressures Ps_fl, Ps_fr, Ps_rl, and Ps_rr are calculated from the expressions (21), (22), (23) and (24).

$$Ps\_fl = Pm + Ka\_f \times \tau d \quad (21)$$

$$Ps\_fr = Pm + Ka\_f \times \tau d + \Delta Ps\_f \quad (22)$$

$$Ps\_rl = Pm\_r + Ka\_r \times \tau d \quad (23)$$

$$Ps\_rr = Pm\_r + Ka\_r \times \tau d + \Delta Ps\_r \quad (24)$$

In case of Fld=1 and the lane deviation to the right, the four desired wheel-brake cylinder pressures Ps_fl, Ps_fr, Ps_rl, and Ps_rr are calculated from the expressions (25), (26), (27) and (28).

$$Ps\_fl = Pm + Ka\_f \times \tau d + \Delta Ps\_f \quad (25)$$

$$Ps\_fr = Pm + Ka\_f \times \tau d \quad (26)$$

$$Ps\_rl = Pm\_r + Ka\_r \times \tau d + \Delta Ps\_r \quad (27)$$

$$Ps\_rr = Pm\_r + Ka\_r \times \tau d \quad (28)$$

In case of Fld=0, the four desired wheel-brake cylinder pressures Ps_fl, Ps_fr, Ps_rl, and Ps_rr are calculated from the expressions (29) and (30).

$$Ps\_fl = Ps\_fr = Pm + Ka\_f \times \tau d \quad (29)$$

$$Ps\_rl = Ps\_rr = Pm\_r + Ka\_r \times \tau d \quad (30)$$

where Pm_r is a rear-wheel master cylinder pressure for the rear hydraulic brake section and determined taking account of the pressure distribution between the brake-fluid pressure to the front wheel brakes and the brake-fluid pressure to the rear wheel brakes, according to a predetermined pressure distribution characteristic, and Ka_f is a conversion factor needed to convert or allocate desired braking force τd (calculated through step S304) for vehicle-to-vehicle control to the front wheel-brake cylinder pressure (Ps_fl, Ps_fr), and Ka_r is a conversion factor needed to convert or allocate desired braking force τd for vehicle-to-vehicle control to the rear wheel-brake cylinder pressure (Ps_rl, Ps_rr).

At step S307, depending on whether lane-deviation decision flag Fld is set (=1) or reset (=0), a limiter processing is made to the desired driving force τa (calculated through step S304) for vehicle-to-vehicle distance control, so as to prevent a command signal value corresponding to the desired driving force for vehicle-to-vehicle distance control from exceeding a specified level and to derive or calculate a final desired driving force Ns limited to a value less than the specified level, as follows.

In case of Fld=1, final desired driving force Ns is calculated from the following expression (31)

$$Ns = \tau a - Ns0 \tag{31}$$

where Ns0 denotes a reduced amount for the desired driving force. In case of Fld=1, final desired driving force Ns may be limited to a fixed value such as "0", that is, Ns=0, instead of using the expression (31).

Conversely in case of Fld=0, desired driving force τa (calculated through step S304) for vehicle-to-vehicle distance control is set directly to final desired driving force Ns as can be seen from the following expression (32).

$$Ns = \tau a \tag{32}$$

In a transition period from a state of Fld=1 (see the expression (31)) to a state of Fld=0 (see the expression (32)), desired-driving-force reduced amount Ns0 may be decreasingly controlled gradually to "0". Alternatively, assuming that final desired driving force Ns is fixed to a certain value such as "0" in case of Fld=1, in presence of the transition from Fld=1 to Fld=0, final desired driving force Ns may be gradually increased up to desired driving force τa. In lieu thereof, desired-driving-force reduced amount Ns0 may be set to a predetermined constant. Alternatively, desired-driving-force reduced amount Ns0 may be calculated as a variable based on desired front wheel-brake cylinder pressure difference ΔPs_f and desired rear wheel-brake cylinder pressure difference ΔPs_r, from the following expression.

$$Ns0 = Kl\_f \times \Delta Ps\_f + Kl\_r \times \Delta Ps\_r$$

where Kl_f is a conversion factor needed to convert desired front wheel-brake cylinder pressure difference ΔPs_f (calculated through step S306) for lane deviation avoidance control to a braking force for the front wheel side, and Kl_r is a conversion factor needed to convert desired rear wheel-brake cylinder pressure difference ΔPs_r (calculated through step S306) for lane deviation avoidance control to a braking force for the rear wheel side. In case that desired-driving-force reduced amount Ns0 is calculated based on desired wheel-brake cylinder pressure differences ΔPs_f and ΔPs_r from the expression Ns0=Kl_f×ΔPs_f+Kl_r×ΔPs_r, in a transition period from Fld=1 to Fld=0, desired-driving-force reduced amount Ns0 may be decreasingly controlled gradually to "0". Alternatively, final desired driving force Ns maybe fixed to a certain value such as "0" in case of Fld=1. In this case, in the presence of the transition from Fld=1 to Fld=0, it is preferable to gradually increase final desired driving force Ns up to desired driving force τa.

Subsequently to step S307, steps S308 and S309 occur in that order. Step S308 of FIG. 3 is identical to step S208 of FIG. 2, whereas step S309 of FIG. 3 is identical to step S209 of FIG. 2. Therefore, detailed description of steps S308 and S309 will be omitted because the above description thereon seems to be self-explanatory.

As discussed above, according to the lane deviation avoidance system of the embodiment that executes the braking-force/driving-force control routine shown in FIG. 3, when there is a possibility of the host vehicle's lane deviation from the driving lane, the value of the controlled variable of the driving force for vehicle-to-vehicle control can be properly limited (see step S307 of FIG. 3). Therefore, it is possible to prevent undesired mutual interference between the driving force produced for vehicle-to-vehicle distance control and the braking force produced for lane deviation avoidance control. For the reasons set out above, it is possible to jointly use both the lane deviation avoidance control and at least one of the vehicle-to-vehicle distance control and cruise control (constant-speed control). In the lane deviation avoidance system shown in FIGS. 1 and 3, step S304 functions as a vehicle-to-vehicle distance controlled variable calculation means.

Referring now to FIG. 4, there is shown the second modification of the braking-force/driving-force control routine. The braking-force/driving-force control routine of the second modification shown in FIG. 4 is also executed as time-triggered interrupt routines to be triggered every predetermined intervals such as 10 milliseconds. The modified routine of FIG. 4 is similar to the routine of FIG. 2, except that, the lane deviation avoidance system, which executes the modified routine of FIG. 4, uses a lane deviation avoidance control enabling flag Fld0 as well as lane-deviation decision flag Fld (see steps S404, S406, S407 and S408 described later).

At step S401, in the same manner as step S201, more recent input informational data received from various sensor systems 13, 23, 33, 43, 51, 52, 53, 54, and 55, and controllers 60 and 70, that is, $Vw_{FL}$, $Vw_{FR}$, $Vw_{RL}$, $Vw_{RR}$, φ, Pm, Acc, the direction indicator switch data signal, θ, the information data regarding the current driving torque, Φ (the host vehicle's yaw angle), X (the lateral deviation from the central axis of the host vehicle's lane), and β (the curvature of the host vehicle's lane) are read. Within camera controller 70, the processor image-processes the forward picture image based on image data from monocular camera 71, and then extracts and recognizes the borderline of the forward line such as a white warning line or a centerline, thereby computing or determining the host vehicle's yaw angle Φ, lateral deviation X and curvature β.

Step S402 of FIG. 4 is identical to step S202 of FIG. 2. At step S402, estimate Xs of lane deviation is estimated based on the host vehicle's yaw angle Φ, lateral deviation X, curvature β, and vehicle speed V, from the expression (1), that is, Xs=Tt×V(Φ+Tt×V×β)+X.

Step S403 of FIG. 4 is identical to step S203 of FIG. 2. At step S403, a check for lane deviation is made, based on the comparison result between lane-deviation estimate Xs and predetermined lane-deviation criterion Xc, to estimate whether or not the host vehicle is apt to deviate from its driving lane.

At step S404, a check is made to determine, based on accelerator opening Acc, whether the lane deviation avoidance control (in other words, the braking force control for lane deviation avoidance) should be enabled or disabled (or inhibited). Concretely, a comparison check between the accelerator opening Acc and a predetermined criterion Acc0 needed for determining whether the lane deviation avoidance control should be enabled or disabled is made. More concretely, when accelerator opening Acc is greater than or equal to predetermined criterion Acc0, that is, in case of Acc≧Acc0, the processor of controller 50 determines that the driving force control, which may be often executed during a lane-changing operation while accelerating the host vehicle, holds priority over the braking force control for lane deviation avoidance. In this case, lane deviation avoidance control enabling flag Fld0 is reset (Fld0=0). Conversely when accelerator opening Acc is less than predetermined criterion Acc0, that is, in case of Acc<Acc0, the processor of controller 50 determines that the braking force control for lane deviation avoidance is enabled. In this case, lane deviation avoidance control enabling flag Fld0 is set (Fld0=1).

Step S405 of FIG. 4 is identical to step S204 of FIG. 2. At step S405, desired driving force Nm is arithmetically calculated based on accelerator opening Acc read through step S401. Instead of using desired driving force Nm calculated in the same manner as step S204 of FIG. 2, desired driving force τa for vehicle-to-vehicle distance control, which can be calculated in the same manner as step S304 of FIG. 3, may be used.

At step S406, a desired yawing moment Ms, that is, a desired value of yawing moment to be applied to the host vehicle for lane deviation avoidance, is computed or arithmetically calculated based on both the lane-deviation estimate Xs and predetermined lane-deviation criterion Xc and also determined depending on lane deviation avoidance control enabling flag Fld0 as well as lane-deviation decision flag Fld, as follows. In case that lane-deviation decision flag Fld and lane deviation avoidance control enabling flag Fld0 are both set (Fld=1 and Fld0=1), desired yawing moment Ms is calculated based on lane-deviation estimate Xs and predetermined lane-deviation criterion Xc from the following expression (33).

$$Ms = -K1 \times K2(Xs-Xc) \tag{33}$$

where K1 is a constant, and K2 is a gain (a variable) that varies depending on the vehicle speed.

In case that either one of (i) a state defined by FLd=1 and Fld0=0, (ii) a state defined by FLd=0 and Fld0=1, and (iii) a state defined by Fld=0 and Fld0=0 is satisfied, desired yawing moment Ms is calculated from the following expression (34).

$$Ms = 0 \tag{34}$$

In a transition period from a state defined by Fld0=1 to a state defined by Fld0=0, it is preferable to gradually reduce desired yawing moment Ms down to "0".

Step S407 of FIG. 4 is similar to step S206 of FIG. 2, except that, in addition to lane-deviation decision flag Fld, lane deviation avoidance control enabling flag Fld0 based on accelerator opening Acc, in other words, the driver's accelerating requirement is further taken into account. At step S407, a desired braking force (substantially corresponding to a desired wheel-brake cylinder pressure Ps in each of wheel-brake cylinders 12, 22, 32, and 42) to be applied to each road wheel is arithmetically calculated based on desired yawing moment Ms calculated through step S406 and master cylinder pressure Pm sensed by master cylinder pressure sensor 52, and also depending on both lane-deviation decision flag Fld and lane deviation avoidance control enabling flag Fld0. Desired wheel-brake cylinder pressures Ps (that is, desired front-left, front-right, rear-left, and rear-right wheel-brake cylinder pressures Ps_fl, Ps_fr, Ps_rl, and Ps_rr) are calculated based on the result of comparison between the absolute value |Ms| of desired yawing moment Ms and predetermined yawing-moment threshold value Ms0. Concretely, in case of |Ms|<Ms0, the processor of controller 50 calculates the four desired wheel-brake cylinder pressures Ps_fl, Ps_fr, Ps_rl, and Ps_rr, in such a manner as to produce the difference of braking force between rear road wheels 30 and 40. Conversely in case of |Ms|≧Ms0, the processor of controller 50 calculates the four desired wheel-brake cylinder pressures Ps_fl, Ps_fr, Ps_rl, and Ps_rr, in such a manner as to produce the difference of braking force between front road wheels 10 and 20 as well as the difference of braking force between rear road wheels 30 and 40. In case of Fld=1, Fld0=1 and |Ms|<Ms0, desired front wheel-brake cylinder pressure difference ΔPs_f and desired rear wheel-brake cylinder pressure difference ΔPs_r are calculated from the expressions (5) and (6), that is, ΔPs_f=0 and ΔPs_r=2×Kb_r×|Ms|/T. In case of Fld=1, Fld0=1 and |Ms|≧Ms0, desired front wheel-brake cylinder pressure difference ΔPs_f and desired rear wheel-brake cylinder pressure difference ΔPs_r are calculated from the expressions (7) and (8), that is, ΔPs_f=2×Kb_f (|Ms|−Ms0)/T and ΔPs_r=2×Kb_r×Ms0/T.

Thereafter, taking into account both the direction of lane deviation of the host vehicle from the driving lane and master cylinder pressure Pm created by the driver's brake-pedal depression, the four desired wheel-brake cylinder pressures Ps_fl, Ps_fr, Ps_rl, and Ps_rr are arithmetically calculated from the aforesaid expressions (9)–(18).

In case of Fld=1, Fld0=1 and the lane deviation to the left, the four desired wheel-brake cylinder pressures Ps_fl, Ps_fr, Ps_rl, and Ps_rr are calculated from the expressions (9), (10), (11) and (12).

$$Ps\_fl = Pm \tag{9}$$

$$Ps\_fr = Pm + \Delta Ps\_f \tag{10}$$

$$Ps\_rl = Pm\_r \tag{11}$$

$$Ps\_rr = Pm\_r + \Delta Ps\_r \tag{12}$$

In case of Fld=1, Fld0=1 and the lane deviation to the right, the four desired wheel-brake cylinder pressures Ps_fl, Ps_fr, Ps_rl, and Ps_rr are calculated from the expressions (13), (14), (15) and (16).

$$Ps\_fl = Pm + \Delta Ps\_f \tag{13}$$

$$Ps\_fr = Pm \tag{14}$$

$$Ps\_rl = Pm\_r + \Delta Ps\_r \tag{15}$$

$$Ps\_rr = Pm\_r \tag{16}$$

In case of the union A∪B∪C of (i) a first state A defined by Fld=1 and Fld0=0, (ii) a second state B defined by Fld=0 and Fld0=1, and (iii) a third state C defined by Fld=0 and Fld0=0, the four desired wheel-brake cylinder pressures Ps_fl, Ps_fr, Ps_rl, and Ps_rr are calculated from the expressions (17) and (18).

$$Ps\_fl = Ps\_fr = Pm \tag{17}$$

$$Ps\_rl = Ps\_rr = Pm\_r \tag{18}$$

During a transition period from a state of Fld0=1 to a state of Fld0=0, it is preferable to gradually reduce desired wheel-brake cylinder pressure Ps instead of gradually reducing desired yawing moment Ms calculated through step S406. In such a case, the value of the controlled variable for lane deviation avoidance control can be gradually reduced, thus ensuring a smooth transition from the braking force control mode for lane deviation avoidance control to the driving force control mode, which may be often executed during the lane-changing operation with vehicle acceleration.

As discussed above, step S407 of FIG. 4 is almost the same step as step S206 of FIG. 2. Alternatively, in a similar manner to step S306 of FIG. 3, at step S407 of FIG. 4 the desired braking force (substantially corresponding to desired wheel-brake cylinder pressure Ps in each of wheel-brake cylinders 12, 22, 32, and 42) to be applied to each road wheel may be arithmetically calculated based on desired braking force τd as calculated through step S304 of FIG. 3, desired yawing moment Ms calculated through step S406, and master cylinder pressure Pm sensed by master cylinder pressure sensor 52. Concretely, in case of Fld=1, Fld0=1 and |Ms|<Ms0, desired front wheel-brake cylinder pressure difference ΔPs_f and desired rear wheel-brake cylinder pressure difference ΔPs_r are calculated from the respective expressions (5) and (6), that is, ΔPs_f=0 and ΔPs_r=2×Kb_r×|Ms|/T. On the contrary, in case of Fld=1, Fld0=1 and |Ms|≧Ms0, desired front wheel-brake cylinder pressure difference ΔPs_f and desired rear wheel-brake cylinder pressure difference ΔPs_r are calculated from the respective expressions (7) and (8), that is, ΔPs_f=2×Kb_f (|Ms|−Ms0)/T and ΔPs_r=2×Kb_r×Ms0/T. Next, taking into account both the direction of lane deviation of the host vehicle from the driving lane and master cylinder pressure Pm created by the driver's brake-pedal depression, the four desired wheel-brake cylinder pressures Ps_fl, Ps_fr, Ps_rl, and Ps_rr are arithmetically calculated from the previously-discussed expressions (21)–(30). In case of Fld=1, Fld0=1 and the lane deviation to the left, the four desired wheel-brake cylinder pressures Ps_fl, Ps_fr, Ps_rl, and Ps_rr are calculated from the expressions (21), (22), (23) and (24).

$$Ps\_fl=Pm+Ka\_f{\times}{\tau}d \quad (21)$$

$$Ps\_fr=Pm+Ka\_f{\times}{\tau}d+{\Delta}Ps\_f \quad (22)$$

$$Ps\_rl=Pm\_r+Ka\_r{\times}{\tau}d \quad (23)$$

$$Ps\_rr=Pm\_r+Ka\_r{\times}{\tau}d+{\Delta}Ps\_r \quad (24)$$

In case of Fld=1, Fld0=1 and the lane deviation to the right, the four desired wheel-brake cylinder pressures Ps_fl, Ps_fr, Ps_rl, and Ps_rr are calculated from the expressions (25), (26), (27) and (28).

$$Ps\_fl=Pm+Ka\_f{\times}{\tau}d+{\Delta}Ps\_f \quad (25)$$

$$Ps\_fr=Pm+Ka\_f{\times}{\tau}d \quad (26)$$

$$Ps\_rl=Pm\_r+Ka\_r{\times}{\tau}d+{\Delta}Ps\_r \quad (27)$$

$$Ps\_rr=Pm\_r+Ka\_r{\times}{\tau}d \quad (28)$$

In case of the union A∪B∪C of (i) a first state A defined by Fld=1 and Fld0=0, (ii) a second state B defined by Fld=0 and Fld0=1, and (iii) a third state C defined by Fld=0 and Fld0=0, the four desired wheel-brake cylinder pressures Ps_fl, Ps_fr, Ps_rl, and Ps_rr are calculated from the expressions (29) and (30).

$$Ps\_fl=Ps\_fr=Pm+Ka\_f{\times}{\tau}d \quad (29)$$

$$Ps\_rl=Ps\_rr=Pm\_r+Ka\_r{\times}{\tau}d \quad (30)$$

Subsequently to step S407, step S408 occurs. Step S408 of FIG. 4 is similar to step S207 of FIG. 2, except that, in addition to lane-deviation decision flag Fld, lane deviation avoidance control enabling flag Fld0, in other words, the driver's accelerating requirement is further taken into account.

At step S408, a limiter processing is made to the desired driving force Nm (calculated through step S405) depending on lane deviation avoidance control enabling flag Fld0 as well as lane-deviation decision flag Fld. In case of the intersection (Fld=1 ∩Fld0=1) of Fld=1 and Fld0=1, final desired driving force Ns is calculated from the previously-noted expression (19), that is, Ns=Nm−Ns0. Conversely in case of the union A∪B∪C of (i) a first state A defined by Fld=1 and Fld0=0, (ii) a second state B defined by Fld=0 and Fld0=1, and (iii) a third state C defined by Fld=0 and Fld0=0, desired driving force Nm (calculated through step S405) is set directly to final desired driving force Ns, that is, Ns=Nm. As discussed above, step S408 of FIG. 4 is almost the same step as step S207 of FIG. 2. Alternatively, in a similar manner to step S307 of FIG. 3, at step S408 of FIG. 4 depending on lane deviation avoidance control enabling flag Fld0 as well as lane-deviation decision flag Fld, a limiter processing is made to desired driving force τa for vehicle-to-vehicle distance control (as calculated through step S304).

Concretely, in case of the intersection (Fld=1∩Fld0=1) of Fld=1 and Fld0=1, final desired driving force Ns is calculated from the previously-noted expression (31), that is, Ns=τa−Ns0.

Conversely in case of the union A∪B∪C of (i) a first state A defined by Fld=1 and Fld0=0, (ii) a second state B defined by Fld=0 and Fld0=1, and (iii) a third state C defined by Fld=0 and Fld0=0, desired driving force τa for vehicle-to-vehicle distance control is set directly to final desired driving force Ns, that is, Ns=τa.

Subsequently to step S408, steps S409 and S410 occur in that order. Step S409 of FIG. 4 is identical to step S208 of FIG. 2, whereas step S410 of FIG. 4 is identical to step S209 of FIG. 2. Therefore, detailed description of steps S409 and S410 will be omitted because the above description thereon seems to be self-explanatory.

As set out above, according to the lane deviation avoidance system of the embodiment that executes the braking-force/driving-force control routine shown in FIG. 4, when there is a possibility of the host vehicle's lane deviation from the driving lane, the processor of controller 50 determines that the driving force control, which may be often executed during a lane-changing operation while accelerating the host vehicle, holds priority over the braking force control for lane deviation avoidance. In other words, in the presence of the remarkable driver's accelerating requirement (i.e., Acc≧Acc0), the lane deviation avoidance control is limited or inhibited or disabled. For example, when accelerating the host vehicle for lane changing, the lane deviation avoidance system of FIG. 4, which uses the comparison result between accelerator opening Acc and predetermined criterion Acc0 to avoid the mutual interference between driving force control for lane changing and braking force control for lane deviation avoidance, can prevent the undesired occurrence of braking force for lane deviation avoidance control. This ensures a good accelerating feel during lane changing with the driver's intention and enables a smooth transition from the braking force control mode for lane deviation avoidance to the driving force control mode for lane changing.

In the shown embodiments, the lane deviation avoidance system is exemplified in the adaptive cruise control (ACC) system equipped rear-wheel-drive vehicle employing the automatic transmission, rear differential, and four-channel braking control system, such as 4-channel ABS system in which individual wheel-brake cylinder pressures (i.e., front-left, front-right, rear-left, and rear-right wheel-brake cylinder pressures are controlled or regulated independently of each other. It will be appreciated from the above, the fundamental concept of the lane deviation avoidance system of the present invention can be applied to a front-wheel-drive vehicle, a four-wheel-drive vehicle, or a hybrid electric vehicle (HEV).

The entire contents of Japanese Patent Application No. 2002-109067 (filed Apr. 11, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive lane deviation avoidance system comprising:
    a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; and
    the control unit putting a priority on the lane deviation avoidance control rather than driving force control by limiting a driving force acting on the host vehicle, when there is the possibility of the host vehicle's lane deviation from the driving lane.

2. An automotive lane deviation avoidance system comprising:
    a driving torque controller that controls a driving force acting on the host vehicle; and
    a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
    (i) a lane deviation estimation section that estimates the presence or absence of the possibility of the host vehicle's lane deviation from the driving lane;
    (ii) a lane deviation avoidance control section that executes the lane deviation avoidance control in the presence of the possibility of the host vehicle's lane deviation from the driving lane; and
    (iii) a driving force limit section that limits a value of a controlled variable of the driving force controlled by the driving torque controller for avoiding a mutual interference between lane deviation avoidance control and driving force control in the presence of the possibility of the host vehicle's lane deviation from the driving lane.

3. The automotive lane deviation avoidance system as claimed in claim 2, which further comprises:
    a vehicle-to-vehicle distance detector that detects a vehicle-to-vehicle distance between a preceding vehicle relative to the host vehicle;
    wherein the control unit comprises:
    (iv) a vehicle-to-vehicle distance controlled variable calculation section that calculates a value of a controlled variable of either of a braking force and a driving force applied to the host vehicle based on the vehicle-to-vehicle distance; and
    (v) a vehicle-to-vehicle distance control section that executes a vehicle-to-vehicle distance control in which the vehicle-to-vehicle distance between the host vehicle and the preceding vehicle is controlled responsively to the value of the controlled variable of either of the braking force and the driving force.

4. An automotive lane deviation avoidance system comprising:
    a driving torque controller that controls a driving force acting on the host vehicle;
    a vehicle-to-vehicle distance detector that detects a vehicle-to-vehicle distance between a preceding vehicle relative to the host vehicle; and
    a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
    (i) a lane deviation estimation section that estimates the presence or absence of the possibility of the host vehicle's lane deviation from the driving lane;
    (ii) a lane deviation avoidance control section that executes the lane deviation avoidance control in the presence of the possibility of the host vehicle's lane deviation from the driving lane; and
    (iii) a driving force limit section that limits a value of a controlled variable of the driving force controlled by the driving torque controller in the presence of the possibility of the host vehicle's lane deviation from the driving lane;
    (iv) a vehicle-to-vehicle distance controlled variable calculation section that calculates a value of a controlled variable of either of a braking force and a driving force applied to the host vehicle based on the vehicle-to-vehicle distance; and
    (v) a vehicle-to-vehicle distance control section that executes a vehicle-to-vehicle distance control in which the vehicle-to-vehicle distance between the host vehicle and the preceding vehicle is controlled responsively to the value of the controlled variable of either of the braking force and the driving force;
    wherein the driving force limit section selects either of a suspending mode in which the vehicle-to-vehicle distance control is suspended and a canceling mode in which the vehicle-to-vehicle distance control is canceled, in the presence of the possibility of the host vehicle's lane deviation from the driving lane.

5. An automotive lane deviation avoidance system comprising:
    a driving torque controller that controls a driving force acting on the host vehicle; and
    a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
    (i) a lane deviation estimation section that estimates the presence or absence of the possibility of the host vehicle's lane deviation from the driving lane;
    (ii) a lane deviation avoidance control section that executes the lane deviation avoidance control in the presence of the possibility of the host vehicle's lane deviation from the driving lane; and
    (iii) a driving force limit section that limits a value of a controlled variable of the driving force to zero in the presence of the possibility of the host vehicle's lane deviation from the driving lane.

6. An automotive lane deviation avoidance system comprising:
    a driving torque controller that controls a driving force acting on the host vehicle; and
    a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
(i) a lane deviation estimation section that estimates the presence or absence of the possibility of the host vehicle's lane deviation from the driving lane;
(ii) a lane deviation avoidance control section that executes the lane deviation avoidance control in the presence of the possibility of the host vehicle's lane deviation from the driving lane; and
(iii) a driving force limit section that limits a value of a controlled variable of the driving force controlled by the driving torque controller for avoiding a mutual interference between the lane deviation avoidance control and driving force control in the presence of the possibility of the host vehicle's lane deviation from the driving lane;
wherein the driving force limit section gradually increases the value of the controlled variable of the driving force, which has been limited in the presence of the possibility of the host vehicle's lane deviation from the driving lane, in a transition period from a state of the presence of the possibility of the host vehicle's lane deviation from the driving lane to a state of the absence of the possibility of the host vehicle's lane deviation from the driving lane.

7. An automotive lane deviation avoidance system comprising:
an accelerator opening sensor that detects an accelerator opening corresponding to a manipulated variable of a driver's accelerator-pedal depression; and
a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
(i) a lane deviation estimation section that estimates the presence or absence of the possibility of the host vehicle's lane deviation from the driving lane;
(ii) a lane deviation avoidance control section that executes the lane deviation avoidance control in the presence of the possibility of the host vehicle's lane deviation from the driving lane;
(iii) a comparison section that compares the accelerator opening to a predetermined criterion to determine whether the accelerator opening is greater than or equal to the predetermined criterion; and
(iv) a lane deviation avoidance control limit section that limits the lane deviation avoidance control when the accelerator opening is greater than or equal to the predetermined criterion.

8. The automotive lane deviation avoidance system as claimed in claim 7, wherein:
the lane deviation avoidance control limit section gradually reduces a value of a controlled variable controlled by the lane deviation avoidance control section when limiting the lane deviation avoidance control.

9. An automotive lane deviation avoidance system comprising:
a driving torque controller that controls a driving force acting on the host vehicle; and
a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
(i) a lane deviation estimation section that estimates the presence or absence of the possibility of the host vehicle's lane deviation from the driving lane;
(ii) a lane deviation avoidance control section that executes the lane deviation avoidance control in the presence of the possibility of the host vehicle's lane deviation from the driving lane; and
(iii) a driving force limit section that limits a value of a controlled variable of the driving force controlled by the driving torque controller for avoiding a mutual interference between the lane deviation avoidance control and driving force control in the presence of the possibility of the host vehicle's lane deviation from the driving lane;
wherein the lane deviation avoidance control section comprises a desired yawing moment calculation section that calculates a desired yawing moment acting on the host vehicle in the direction that avoids the host vehicle from deviating from the driving lane, and a braking-force controlled variable calculation section that calculates a value of a controlled variable of a braking force for every road wheel based on the desired yawing moment; and
wherein an actual yawing moment, acting on the host vehicle in the direction that avoids the host vehicle from deviating from the driving lane, is controlled by a braking-force difference between left and right road wheels, produced based on the values of the controlled variables of the braking force for every road wheel.

10. An automotive lane deviation avoidance system comprising:
a driving force control means for controlling a driving force acting on the host vehicle; and
a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
(i) a lane deviation estimation means for estimating the presence or absence of the possibility of the host vehicle's lane deviation from the driving lane;
(ii) a lane deviation avoidance control means for executing the lane deviation avoidance control in the presence of the possibility of the host vehicle's lane deviation from the driving lane; and
(iii) a driving force limit means for limiting a value of a controlled variable of the driving force controlled by the driving force control means for avoiding a mutual interference between the lane deviation avoidance control and driving force control in the presence of the possibility of the host vehicle's lane deviation from the driving lane.

11. The automotive lane deviation avoidance system as claimed in claim 10, which further comprises:
a vehicle-to-vehicle distance detection means for detecting a vehicle-to-vehicle distance between a preceding vehicle relative to the host vehicle;
wherein the control unit comprises:
(iv) a vehicle-to-vehicle distance controlled variable calculation means for calculating a value of a controlled variable of either of a braking force and a driving force applied to the host vehicle based on the vehicle-to-vehicle distance; and (v) a vehicle-to-vehicle distance control means for executing a vehicle-to-vehicle distance control in which the vehicle-to-vehicle distance between the host vehicle and the preceding vehicle is controlled responsively to the value of the controlled variable of either of the braking force and the driving force.

12. An automotive lane deviation avoidance system comprising:
an accelerator opening detection means for detecting an accelerator opening corresponding to a manipulated variable of a driver's accelerator-pedal depression; and
a control unit that executes a host vehicle's lane deviation avoidance control in which a change in vehicle dynamic behavior occurs in a direction that avoids the host vehicle from deviating from a driving lane when there is a possibility of the host vehicle's lane deviation from the driving lane; the control unit comprising:
(i) a lane deviation estimation means for estimating the presence or absence of the possibility of the host vehicle's lane deviation from the driving lane;
(ii) a lane deviation avoidance control means for executing the lane deviation avoidance control in the presence of the possibility of the host vehicle's lane deviation from the driving lane;
(iii) a comparison means for comparing the accelerator opening to a predetermined criterion to determine whether the accelerator opening is greater than or equal to the predetermined criterion; and
(iv) a lane deviation avoidance control limit means for limiting the lane deviation avoidance control when the accelerator opening is greater than or equal to the predetermined criterion.

13. A method of avoiding an adaptive cruise control system equipped vehicle from deviating from a driving lane, the adaptive cruise control system equipped vehicle employing both a driving force control system, which controls a driving force acting on a host vehicle, and a braking force control system, which controls a braking force for every road wheel, the method comprising:
detecting an accelerator opening corresponding to a manipulated variable of a driver's accelerator-pedal depression;
estimating the presence or absence of a possibility of the host vehicle's lane deviation from the driving lane;
calculating a desired driving force based on the accelerator opening;
calculating a desired yawing moment acting on the host vehicle in a direction that avoids the host vehicle from deviating from the driving lane;
calculating a value of a controlled variable of a braking force for every road wheel based on the desired yawing moment;
executing a host vehicle's lane deviation avoidance control via the braking force control system in the presence of the possibility of the host vehicle's lane deviation from the driving lane; and
simultaneously limiting the desired driving force via the driving force control system for avoiding a mutual interference between the lane deviation avoidance control and driving force control in the presence of the possibility of the host vehicle's lane deviation from the driving lane.

14. A method of avoiding an adaptive cruise control system equipped vehicle from deviating from a driving lane, the adaptive cruise control system equipped vehicle employing both a driving force control system, which controls a driving force acting on a host vehicle, and a braking force control system, which controls a braking force for every road wheel, the method comprising:
estimating the presence or absence of a possibility of the host vehicle's lane deviation from the driving lane;
detecting a vehicle-to-vehicle distance between a preceding vehicle relative to the host vehicle;
calculating a value of a controlled variable of either of a braking force and a driving force applied to the host vehicle based on the vehicle-to-vehicle distance;
calculating a desired yawing moment acting on the host vehicle in a direction that avoids the host vehicle from deviating from the driving lane;
calculating a value of a controlled variable of a braking force for every road wheel based on the desired yawing moment and the value of the controlled variable of the braking force;
executing a vehicle-to-vehicle distance control in which the vehicle-to-vehicle distance between the host vehicle and the preceding vehicle is controlled responsively to the value of the controlled variable of either of the braking force and the driving force;
executing a host vehicle's lane deviation avoidance control via the braking force control system in the presence of the possibility of the host vehicle's lane deviation from the driving lane; and
simultaneously limiting the value of the controlled variable of the driving force via the driving force control system for avoiding a mutual interference between the lane deviation avoidance control and driving force control in the presence of the possibility of the host vehicle's lane deviation from the driving lane.

15. A method of avoiding an adaptive cruise control system equipped vehicle from deviating from a driving lane, the adaptive cruise control system equipped vehicle employing both a driving force control system, which controls a driving force acting on a host vehicle, and a braking force control system, which controls a braking force for every road wheel, the method comprising:
detecting an accelerator opening corresponding to a manipulated variable of a driver's accelerator-pedal depression;
estimating the presence or absence of a possibility of the host vehicle's lane deviation from the driving lane;
determining, based on a result of comparison between the accelerator opening and a predetermined criterion, whether a host vehicle's lane deviation avoidance control should be enabled or disabled, to set a lane deviation avoidance control enabling flag when the accelerator opening is less than the predetermined criterion and thus the lane deviation avoidance control is enabled and to reset the lane deviation avoidance control enabling flag when the accelerator opening is greater than or equal to the predetermined criterion and thus the lane deviation avoidance control is disabled;
calculating a desired driving force based on the accelerator opening;
calculating a desired yawing moment acting on the host vehicle in a direction that avoids the host vehicle from deviating from the driving lane;
calculating a value of a controlled variable of a braking force for every road wheel based on the desired yawing moment;
executing a host vehicle's lane deviation avoidance control via the braking force control system, while simultaneously limiting the desired driving force via the driving force control system in the presence of the possibility of the host vehicle's lane deviation from the driving lane; and inhibiting the lane deviation avoidance control irrespective of the presence or absence of the possibility of the host vehicle's lane deviation from the driving lane when the lane deviation avoidance control enabling flag is reset.

* * * * *